(12) United States Patent
Kapchie et al.

(10) Patent No.: US 10,667,536 B2
(45) Date of Patent: *Jun. 2, 2020

(54) READY-TO-DRINK MILK BEVERAGES WITH IMPROVED TEXTURE/MOUTHFEEL BY CONTROLLED PROTEIN AGGREGATION, AND METHOD OF MAKING THEREOF

(71) Applicant: NESTEC S.A., Vevey (CH)

(72) Inventors: Virginie Kapchie, Dublin, OH (US); Jun-Tse Ray Fu, Dublin, OH (US); Madansinh Nathusinh Vaghela, Bakersfield, CA (US); Lu Wang, Dublin, OH (US); Philippe Rousset, Dublin, OH (US); Alexander A. Sher, Dublin, OH (US)

(73) Assignee: Societe des Produits Nestle S.A., Vevey (CH)

(*) Notice: Subject to any disclaimer, the term of this patent is extended or adjusted under 35 U.S.C. 154(b) by 199 days.

This patent is subject to a terminal disclaimer.

(21) Appl. No.: 15/538,108

(22) PCT Filed: Dec. 21, 2015

(86) PCT No.: PCT/EP2015/080848
§ 371 (c)(1),
(2) Date: Jun. 20, 2017

(87) PCT Pub. No.: WO2016/102503
PCT Pub. Date: Jun. 30, 2016

(65) Prior Publication Data
US 2017/0367361 A1    Dec. 28, 2017

Related U.S. Application Data
(60) Provisional application No. 62/095,160, filed on Dec. 22, 2014.

(51) Int. Cl.
*A23C 9/156* (2006.01)
*A23G 1/56* (2006.01)
(Continued)

(52) U.S. Cl.
CPC .............. *A23C 9/156* (2013.01); *A23C 9/154* (2013.01); *A23C 9/1522* (2013.01);
(Continued)

(58) Field of Classification Search
CPC .......... A23V 2002/00; A23V 2250/042; A23V 2250/51082; A23V 2250/54246;
(Continued)

(56) References Cited

U.S. PATENT DOCUMENTS 4,446,164 A * 5/1984 Brog ................. A23C 21/04
426/583
6,413,561 B1 * 7/2002 Sass .................... A23C 9/1322
426/590

(Continued)

FOREIGN PATENT DOCUMENTS

WO      2011076572       6/2011
WO   WO-2013132265 A2 * 9/2013 ............... A23J 3/08
WO      2014131792       9/2014

OTHER PUBLICATIONS

Brochure Entitled "GNPD—Coffee Flavoured Ready-To-Drink Weight Management Shake", 2013, 2 pages.

*Primary Examiner* — Tamra L. Dicus
(74) *Attorney, Agent, or Firm* — K&L Gates LLP

(57) ABSTRACT

The present invention relates to beverage products. In particular, the invention is concerned with a protein system induced by controlled aggregation of milk proteins which imparts outstanding sensory attributes on beverage product, in particular when containing low fat and/or low sugar. A (Continued)

method of producing such beverage and the products obtainable from the method are also part of the present invention.

12 Claims, 2 Drawing Sheets

(51) Int. Cl.
    *A23L 29/256*     (2016.01)
    *A23L 29/262*     (2016.01)
    *A23C 9/152*     (2006.01)
    *A23C 9/154*     (2006.01)
    *A23J 1/20*     (2006.01)

(52) U.S. Cl.
    CPC .............. *A23C 9/1542* (2013.01); *A23G 1/56* (2013.01); *A23J 1/207* (2013.01); *A23L 29/256* (2016.08); *A23L 29/262* (2016.08); *A23V 2002/00* (2013.01)

(58) Field of Classification Search
    CPC .... A23V 2250/54252; A23V 2200/242; A23V 2200/254; A23V 2250/50366; A23V 2250/5054; A23V 2250/51084; A23V 2200/06; A23V 2200/212; A23V 2250/0628; A23V 2250/1578; A23V 2300/26
    See application file for complete search history.

(56) References Cited

U.S. PATENT DOCUMENTS

| | | | |
|---|---|---|---|
| 2004/0228954 A1 | 11/2004 | Tejayadi | |
| 2011/0250310 A1* | 10/2011 | Mateus | A23C 21/04 426/2 |
| 2013/0129879 A1* | 5/2013 | White | A23C 11/103 426/271 |
| 2013/0129899 A1* | 5/2013 | Ummadi | A23C 3/02 426/580 |
| 2016/0000123 A1* | 1/2016 | Sher | A23L 2/52 426/584 |
| 2018/0220667 A1* | 8/2018 | Sher | A23L 29/281 |

* cited by examiner

READY-TO-DRINK MILK BEVERAGES WITH IMPROVED TEXTURE/MOUTHFEEL BY CONTROLLED PROTEIN AGGREGATION, AND METHOD OF MAKING THEREOF

CROSS REFERENCE TO RELATED APPLICATIONS

The present application is a National Stage of International Application No. PCT/EP2015/080848, filed on Dec. 21, 2015, which claims priority to U.S. Provisional Patent Application No. 62/095,160, filed on Dec. 22, 2014, the entire contents of which are being incorporated herein by reference.

FIELD OF THE INVENTION

The present disclosure generally relates to milk containing beverages.

More specifically, the present disclosure relates to ready to drink ("RTD") reduced fat and/or sugar beverages containing a milk component, a flavor component and a stabilizing system and also relates to methods for making same.

The present invention relates to RTD milk beverage. More specifically, the present disclosure is directed to RTD milk beverage with improved texture/mouthfeel.

BACKGROUND OF THE INVENTION

The current trend is that consumers are more health conscious and are looking for healthier beverages with less sugar and less fat and calories but without compromising the product taste and texture. In addition, consumers demand a healthier beverage, yet they are not willing to give up the original, indulgent mouthfeel they grew up with and remember, also denoted as richness, texture or creaminess, of the beverages. Thus, many RTD beverages are transitioning from high sugar and/or fat versions to versions with less sugar and/or fat to limit the calories in the beverage. However, sugar and/or fat reduction results in a thin, less pleasing mouthfeel of the beverages. Therefore, there is a need for a solution that improves and compensates the loss of mouthfeel in reduced sugar/fat RTD milk beverages to maintain the consumer preference.

It is critical not only to enhance texture/mouthfeel of RTD milk beverage but also have stable liquid beverages as is without compromising product stability over shelf life (at least 6 months at refrigeration for extended shelf life (ESL) products; and 7 months at refrigeration, 6 months at 20° C., 4 months at 30° C. and 2 months at 38° C. for aseptic products).

The present invention relates to stabilizing systems and composition of non-milk shelf-stable aseptically packaged liquid RTD milk beverages, and to the process of making thereof.

SUMMARY OF THE INVENTION

The present disclosure provides ready-to-drink milk beverages and also provides methods for making such beverages. The ready-to-drink milk beverages can have reduced sugar and/or fat, can be ESL or aseptic, and can have a pleasant mouthfeel. The ready-to-drink milk beverages can have an improved physico-chemical stability during storage, e.g., stable for at least 6 months at refrigeration for extended shelf life (ESL) products; and 7 months at refrigeration, 6 months at 20° C., 4 months ambient temperatures at 30° C. and 2 months at 38° C. for aseptic products. The milk beverages exhibits reduced gelation and overcome problems with other phase separation/instability issues during different storage conditions over the full life of the milk beverages.

Thus, the present invention now solves the foregoing problems by providing a stable beverage composition having enhanced or improved organoleptic properties.

Provided is composition of aseptic shelf-stable liquid RTD milk beverage, formed by the interaction of oil(s)/fat(s), protein(s), carbohydrate(s), and optionally sweetener(s), flavor(s), and stabilized by the use of complex systems containing the combinations of hydrocolloids.

In a first aspect, the invention relates to a ready to RTD milk beverage comprising:
  a milk component comprising casein and whey proteins wherein ratio between casein and whey protein ranges from 75:25 to 60:40;
  a flavor component selected from the group consisting of a cocoa component, a fruit flavor component, and a combination thereof;
  a sugar
  an acidifier
  a stabilizing system comprising a mixture of microcrystalline cellulose (MCC), carboxymethyl cellulose (CMC) and carrageenan
  wherein the beverage upon reconstitution in an aqueous medium comprises casein-whey protein aggregates having a volume based mean diameter value D[4,3] of at least 3 μm as measured by laser diffraction.

The aseptic RTD milk beverages are shelf-stable at 4° C. for at least 7 months, at 20° C. for at least 6 months, for at least 4 months at 30° C., and for at least 2 month at 38° C. The ESL RTD milk beverages are shelf-stable at 4° C. for at least 6 months.

The products of the invention present excellent organoleptic properties, in particular in terms of texture and mouthfeel even when very low levels of fat or sugar are used. Besides, the products of the invention show good stability over extended product shelf-life.

Another aspect of the present invention relates to a method of producing a RTD milk beverage comprising the steps of:
  Mixing ingredients
  adjusting to achieve pH range from 5.9 to 6.2;
  Homogenization of the beverage composition before the pre-heating step;
  adjustment of pH to 5.9 to 6.2 and heating to temperature ranging from 75 to 99° C. and holding for 15 seconds to 400 seconds to obtain a beverage base product;
  Cooling the obtained beverage base product to 65° C. or below;
  Adding buffer to achieve pH of 6.7 to 7.0;
  Sterilizing at UHT conditions at 136-150° C. for 3-15 seconds
  Cooling the obtained beverage base product to 25° C. or below; and
  Filling aseptically for UHT beverages in aseptic containers.

DETAILED DESCRIPTION OF THE INVENTION

Figure 1:
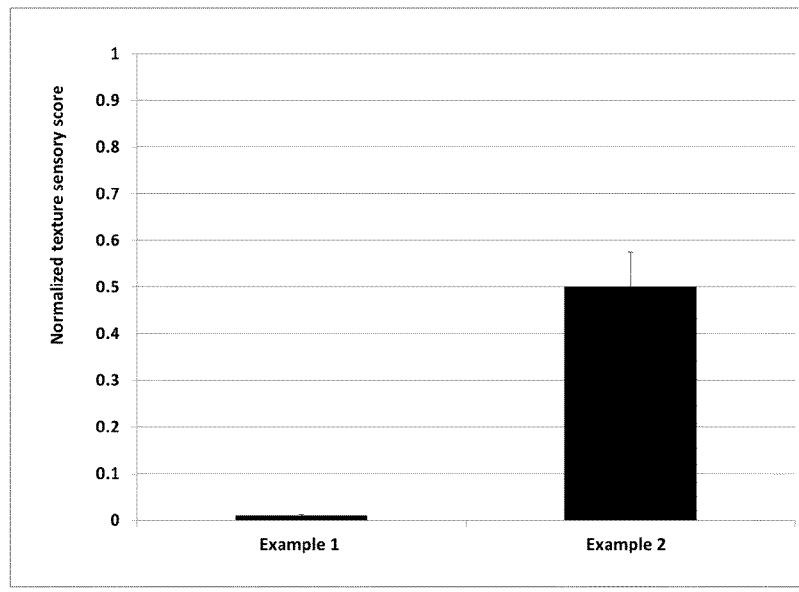
FIG. 1 represents sensory texture evaluation of beverages prepared with and without controlled protein aggregation.

In the following description, the % values are in w/w % unless otherwise specified.

The present invention pertains to protein containing beverage, more particularly to RTD beverage. The present invention addresses the following issues:

Significantly improved product texture/mouthfeel of reduced fat/reduced sugar RTD milk beverages Developed beverage with no physical instability issues of reduced fat/reduced sugar RTD milk beverages Provided stable RTD milk beverages with unique texture and taste during product shelf life There are no current solutions using controlled protein aggregation for shelf stable RTD milk beverages with low sugar/fat content which have a mouthfeel similar to full sugar beverages and are shelf-stable during the life of the beverage.

Advantageously and unexpectedly, a unique combination of the hydrocolloid stabilizing system ingredients, specific ratio of casein to whey proteins, specific combination of pH, heat and holding time were found to improve beverage texture/mouthfeel and provide a pleasant, smooth creamy taste of RTD milk beverage. In addition, the desired texture improvement and desired product shelf life stability was found only when the homogenization was done prior to applying specific combination of pH, heat and holding time for controlled protein aggregation.

As a result, the reduced fat/reduced sugar RTD milk beverage has improved texture and good physico-chemical stability during shelf life. The novel hydrocolloid texturizing/stabilizing system includes stabilizing system comprising a mixture of microcrystalline cellulose (MCC), carboxymethyl cellulose (CMC) in the range of about 0.05-0.18 w/w %, and carrageenan in the range of about 0.01-0.10 w/w %.

If we use the hydrocolloids outside the above ranges, gelation or phase separation issues (e.g. serum, sedimentation) will occur (examples within and outside of the ranges are provided below).

In a first aspect, the invention relates to a RTD milk beverage comprising:
a milk component comprising casein and whey proteins wherein ratio between casein and whey protein is from 75:25 to 60:40;
a flavor component selected from the group consisting of a cocoa component, a fruit flavor component, and a combination thereof;
a sugar
an acidifier
a stabilizing system comprising a co-processed microcrystalline cellulose (MCC), carboxymethyl cellulose (CMC) in the range of about 0.05-0.18 w/w %, and carrageenan in the range of about 0.01-0.10 w/w %.

The beverage comprises casein-whey protein aggregates having a volume based mean diameter value D[4,3] of at least 3 μm as measured by laser diffraction.

In one embodiment of the present invention, the carrageenan is present from about 0.01% to about 0.10 w/w % of the beverage.

In one embodiment of the present invention, the MCC and CMC are present in co-processed forms and wherein the amount ranges from about 0.05 to about 0.18 w/w %.

In one embodiment of the present invention, the acidifier comprises but not limited to lactic acid, glucono delta-lactone (GdL), phosphoric acid, ascorbic acid, acetic acid, citric acid, malic acid, hydrochloric acid, or combination of thereof.

The term "GdL" is a lactone (cyclic ester) of D-gluconic acid. Upon addition to water, GdL is partially hydrolysed to gluconic acid, with the balance between the lactone form and the acid form established at chemical equilibrium.

In one embodiment of the present invention, the RTD milk beverage further comprises calcium salts for calcium fortification.

In one embodiment of the present invention, the calcium salt comprises but not limited to calcium carbonate, calcium phosphate, calcium lactate-citrate, calcium citrate, or combination of thereof.

In an embodiment, the product includes a buffering agent. The buffering agent can be, for example, monophosphates, diphosphates, sodium mono- and bicarbonates, potassium mono- and bicarbonates or a combination thereof. More specifically, non-limiting examples of suitable buffers are salts such as potassium phosphate, potassium phosphate, potassium bicarbonate, potassium citrate, sodium bicarbonate, sodium citrate, sodium phosphate, disodium phosphate. The buffer can be present in an amount of about 0.05 to about 0.3% of the total weight of the product.

In an embodiment, the product includes addition of sugar, wherein sugar is sucrose up to about 4.5 w/w %.

In an embodiment, the product includes addition of natural and/or artificial sweeteners.

In an embodiment, the product includes addition of cocoa powder, flavours such as chocolate, vanilla, banana, strawberry, raspberry, milk or combination of thereof.

Liquid Beverage Composition and Product

A beverage composition according to the invention comprises the RTD milk beverage as described in the present invention and may be any beverage composition, meant to be consumed by a human or animal, such as e.g. a beverage, e.g. a coffee beverage, a cocoa or chocolate beverage, a malted beverage, a fruit or juice beverage, or a milk based beverage; a performance nutrition product, a medical nutrition product; a milk product, e.g. a milk drink, a product for improving mental performance or preventing mental decline, or a skin improving product.

Beverage or Beverage Composition

A beverage according to the invention comprises the RTD milk beverage as described in the present invention and may e.g. be in the form of a ready-to-drink beverage. By a ready-to-drink beverage is meant a beverage in liquid form ready to be consumed without further addition of liquid. A beverage according to the invention may comprise any other suitable ingredients known in the art for producing a beverage, such as e.g. sweeteners, e.g. sugar, such as invert sugar, sucrose, fructose, glucose, or any mixture thereof, natural or artificial sweetener; aromas and flavors, e.g. fruit, cola, coffee, or tea aroma and/or flavor; fruit or vegetable juice or puree; milk; stabilizers; natural or artificial color; preservatives; antioxidants, or combination of thereof.

A ready-to-drink beverage may be subjected to a heat treatment to increase the shelf life or the product, UHT (Ultra High Temperature) treatment, HTST (High Temperature Short Time) pasteurization, batch pasteurization, or hot fill.

Milk protein containing liquid beverages are beverages or beverage concentrates containing milk (e.g. fluid, fat-removed, lactose-removed, powder, concentrate, fractionated) or the proteins obtained, whether native or modified, from milk, or a mixture thereof.

According to a particular embodiment, the pH of preheat treatment stage is controlled by the presence of an acidic component. The acidic component is preferably selected but not limited from the group consisting of lactic acid, Glucono glucono delta-lactone (GdL), phosphoric acid, ascorbic acid, acetic acid, citric acid, malic acid, hydrochloric acid, molasses, fruit derived acids and fermentation derived acids.

According to a particular embodiment, the product according to the invention comprises about 0 to about 2 w/w % fat, up to about 3.5 w/w % protein and sweetening agent, e.g. sugar from about 0 to 4.5 w/w %.

By "sweetening agent" it is to be understood an ingredient or mixture of ingredients which imparts sweetness to the final product. These include natural sugars like cane sugar, beet sugar, molasses, other plant derived nutritive and non-nutritive sweeteners, and chemically synthesized non-nutritive high intensity sweeteners.

The reduction of fat in beverages without compromising the indulgent quality of the product is one of the main challenges faced by the industry. The present invention is overcoming this issue in providing low fat or even non-fat products with similar texture and sensory attributes than those having higher fat contents in terms of texture/mouthfeel.

The products include a stabilizer system.

A "stabilizer system" is to be understood as an ingredient or a mixture of ingredients which contributes to the stability of the beverage product with respect to shelf life. Thus, the stabilizer system may comprise any ingredients which provide physical stability to the beverage.

The stabilizer system that may be used in the present products comprises a co-processed microcrystalline cellulose (MCC), carboxymethyl cellulose (CMC) in the range of about 0.05-0.18 w/w %, and carrageenan in the range of about 0.01-0.10 w/w %.

The product may additionally comprise flavors or colorants. These are used in conventional amounts which can be optimized by routine testing for any particular product formulation. It has been surprisingly found out that the presence of this controlled protein aggregation system in a beverage according to the invention improves the sensory profile of the product and in particular that it enhances considerably the smooth and creamy texture of said beverage that contains this system.

It is a common knowledge that addition of proteins to the beverage (e.g. whey) will lead to enhanced mouthfeel. It was surprisingly found that when controlled protein aggregation is created, addition of whey proteins significantly improves (much higher compared to that without protein aggregation) product mouthfeel only at the specific casein to whey ratio, i.e. wherein ratio between casein and whey proteins is from about 75:25 to about 60:40, probably due to the synergy within new structure formation. Addition of whey proteins above 60:40 ratio resulted in decrease of beverage mouthfeel.

The present invention is a directed controlled protein aggregation system produced by an acidic component and specific pre-heat treatment conditions, i.e. specific combination pH, temperature and holding time in proteins such as milk proteins, which has shown to considerably improve the mouthfeel and creaminess of the beverage of the invention.

Furthermore, the product of the invention has proven to be particularly stable, both when refrigerated as well as when kept at room temperature for consumption.

The invention relates in a further aspect to the use of a controlled protein aggregation system including casein and whey proteins for manufacturing a beverage with a pre-heat treatment pH comprised between 5.6 and 6.3, preferably between 5.9 and 6.2.

The invention relates in a further aspect of pre-heating to temperature ranging from 75 to 99° C. and holding for 15 seconds to 400 seconds.

Such a system offers the unexpected advantage that it can confer to the beverage product exceptional sensory attributes with good stability while minimizing the fat and sugar content.

In one aspect the invention deals with a method of producing a beverage comprising the steps of:
  Mixing ingredients
  adjusting to achieve pH range from 5.9 to 6.2
  Homogenization of the beverage composition before the pre-heating step;
  adjustment of pH from 5.9 to 6.2 and heating to temperature ranging from 75 to 99° C. and holding for 15 seconds to 400 seconds to obtain a beverage base product;
  Cooling the obtained beverage base product to 65° C. or below; and
  Adding buffer to achieve pH of 6.7 to 7.0
  Sterilizing at UHT conditions at 136-150° C. for 3-15 seconds
  Cooling the obtained beverage base product to 25° C. or below
  Filling aseptically for UHT beverages in aseptic containers.

The process of the invention has surprisingly proven to enhance the textural experience of beverages according to the invention even at lower fat and/or sugar contents. The applicant has discovered that combination of the four parameters, i.e. the pH, specific pre-heat treatment and holding time of the composition and specific casein to whey protein ratio before sterilization results in a product with smooth, creamy texture and superior shelf life stability when compared to typical beverage products. In addition, it is critical to have a homogenization step before the specific heat treatment.

According to a particular embodiment, the beverage according to the invention comprises an acidic component. The acid component is preferably selected but not limited from the group consisting of lactic acid, glucono delta-lactone (GdL), phosphoric acid, ascorbic acid, acetic acid, citric acid, malic acid, hydrochloric acid, molasses, fruit derived acids and fermentation derived acids, or combination of thereof.

The method of the invention lends itself to the manufacture of beverages according to the invention which are shelf-life stable at the necessary storage temperatures and have superior organoleptic and textural properties.

EXAMPLES

The present invention is illustrated further herein by the following non-limiting examples. In this and in the all other examples of the invention, concentrations of ingredients are given as w/w % based on the whole product formulation.

1% milkfat milk was used in preparation of all samples described in the examples below.

Example 1 (No Controlled Protein Aggregation)

The RTD beverages can be made by the following process:
Hydration (e.g., wetting) of cocoa powder for 45 minutes at 90° C. to form the cocoa slurry.
A co-processed microcrystalline cellulose (MCC) and carboxymethyl cellulose (CMC) were dry blended with carrageenan and sucrose and then were added under high agitation to a separate tank containing fluid milk
Addition under agitation of the cocoa slurry to the fluid milk tank containing hydrocolloids
Addition under agitation of rest of ingredients such as sweetener, buffer, other flavors, and minerals.
Subjection of the beverage to ultra-high temperature ("UHT") heat treatment at about 143° C. for about 3 seconds
Aseptic homogenization at 150/50 bars at 70° C.
The aseptic homogenization is followed by cooling and aseptic filling of the RTD beverage into a suitable aseptic container, e.g. Tetra Paks, jars, jugs or pouches.

Example 2 (with Controlled Protein Aggregation)

The RTD beverages can be made by the following process
Hydration (e.g., wetting) of cocoa powder for 45 minutes at 90° C. to form the cocoa slurry.
A co-processed microcrystalline cellulose (MCC) and carboxymethyl cellulose (CMC) were dry blended with carrageenan and sucrose and then were added under high agitation to the separate tank containing fluid milk.
Addition under agitation of the cocoa slurry to the fluid milk tank containing hydrocolloids
Adjusting to obtain the desired pH of about 6.2 (measured at 4° C.)
Homogenization from at 150/50 bars at 70° C.
Heating to temperature 85° C. and hold for 120 seconds to obtain a beverage base product;
Cooling the obtained beverage base product to 65° C. or below
Add rest of ingredients such as buffer, minerals and flavors
Sterilizing at UHT conditions at 143° C. for 3 seconds
Cooling the obtained product temperature of 25° C. or below
Filling aseptically for UHT beverages into a suitable aseptic container, e.g. Tetra Paks, jars, jugs or pouches.

Example 3 (Comparison of Beverages Prepared with and without Controlled Protein Aggregation)

Beverage without controlled protein aggregation was prepared as in Example 1, and beverage with controlled protein aggregation was prepared as in Example 2.

Beverage physico-chemical properties were evaluated and sensory characteristics were judged by sensory panelists.

No phase separation including syneresis, gelation, marbling and no sedimentation were found in sample prepared as in Example 2 during shelf-life.

It was found that the chocolate drink prepared as in Example 2 has homogeneous appearance during shelf-life and improved texture/mouthfeel. Results of sensory texture evaluation are shown in FIG. 1.

Example 4 (Effect of Casein to Whey Proteins Ratio on Beverage Texture/Mouthfeel)

Beverage with controlled protein aggregation with casein to whey proteins ratio of 75:25 was prepared as in Example 2.

Beverage physico-chemical properties were evaluated and sensory characteristics were judged by sensory panelists.

No phase separation including syneresis, gelation, marbling and practically no sedimentation were found in sample prepared as in Example 2 during shelf-life.

It was found that the chocolate drink prepared as in Example 2 has homogeneous appearance during shelf-life and improved texture/mouthfeel.

Example 5 (Effect of Casein to Whey Proteins Ratio on Beverage Texture/Mouthfeel)

Beverage with controlled protein aggregation with casein to whey proteins ratio of 70:30 was prepared as in Example 2.

Beverage physico-chemical properties were evaluated and sensory characteristics were judged by sensory panelists.

No phase separation including syneresis, gelation, marbling and practically no sedimentation were found in sample prepared as in Example 2 during shelf-life.

It was found that the chocolate drink prepared as in Example 2 has homogeneous appearance during shelf-life and improved texture/mouthfeel.

Example 6 (Effect of Casein to Whey Proteins Ratio on Beverage Texture/Mouthfeel)

Beverage with controlled protein aggregation with casein to whey proteins ratio of 60:40 was prepared as in Example 2.

Beverage physico-chemical properties were evaluated and sensory characteristics were judged by sensory panelists.

No phase separation including syneresis, gelation, marbling and practically no sedimentation were found in sample prepared as in Example 2 during shelf-life.

It was found that the chocolate drink prepared as in Example 2 has homogeneous appearance during shelf-life and improved texture/mouthfeel.

Example 7 (Comparison of Casein to Whey Proteins Ratios on Beverage Texture/Mouthfeel)

Figure 2:
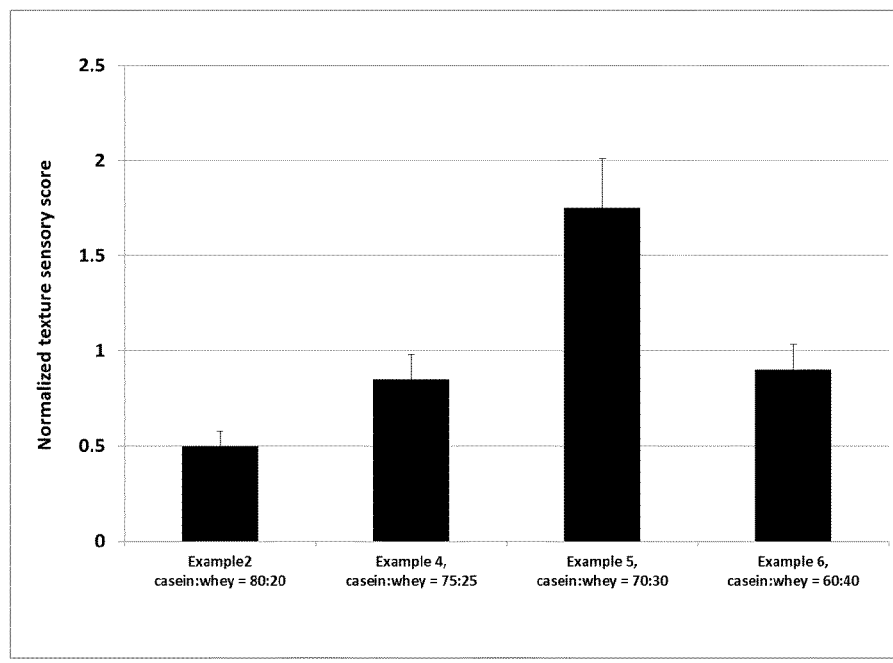
FIG. 2 represents effect of casein to whey proteins ratio on texture/mouthfeel of beverages prepared using controlled protein aggregation.

Significant improvement in texture sensory attribute were found in samples having casein to whey proteins ratio from about 75 to 25 to about 60 to 40. Example of sensory texture evaluation of beverages with some casein to whey proteins ratio are shown in FIG. 2.

Example 8 (Comparison of Casein to Whey Proteins Ratios on Beverage Texture/Mouthfeel with and without Controlled Protein Aggregation)

Significant improvement in texture sensory attribute were found in samples with controlled protein aggregation having casein to whey proteins ratio from about 75 to 25 to about 60 to 40 prepared as described in Example 2. Changing of casein to whey protein ratio in samples without controlled protein aggregation prepared as described in Example 1 showed only very slight increase in beverage texture as compared to those with controlled protein aggregation prepared as described in Example 2. As expected, with higher level of whey, texture of the beverages without protein aggregation showed increase in sensory texture score, while it was unexpectedly found that higher sensory texture evaluation was found only at the specific casein to whey protein ratio.

Figure 3:
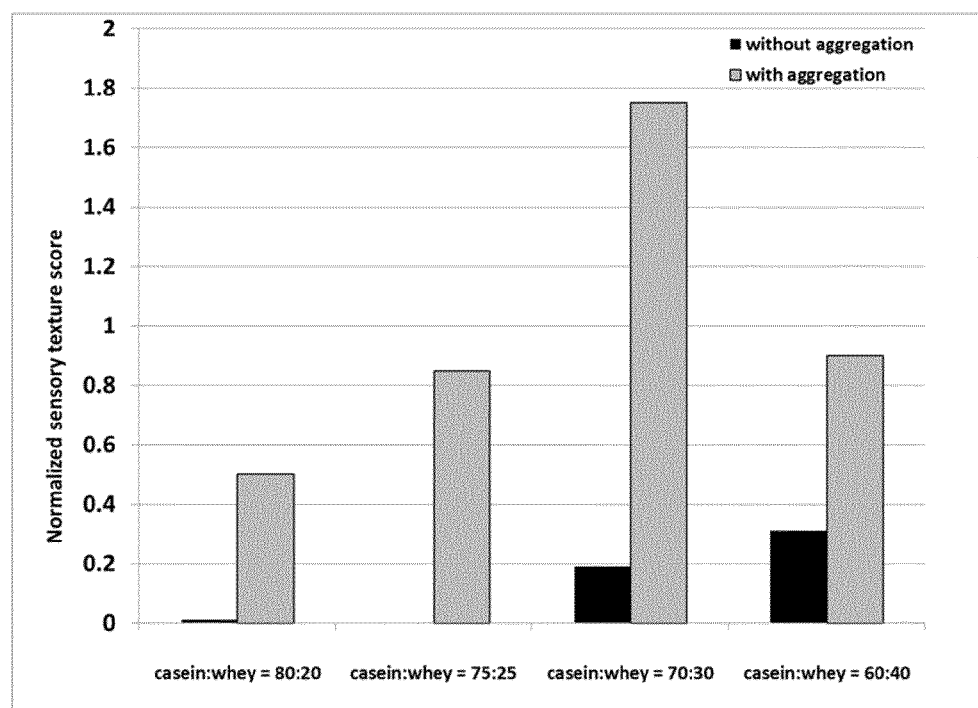
FIG. 3. Texture sensory score of 1% milkfat RTD Chocolate beverage with and without controlled protein aggregation

Example of sensory texture evaluation of beverages with and without controlled protein aggregation at some casein to whey proteins ratio are shown in FIG. 3.

The invention claimed is:

1. A method of producing a ready-to-drink beverage comprising:
    mixing a milk component comprising casein and whey wherein the casein and whey are present in a ratio from about 75:25 to about 60:40, a flavor component, a sugar, an acidifier, and a stabilizer system to form a beverage composition;
    adjusting pH of the beverage composition between 5.9 to 6.2;
    homogenizing the beverage composition after the pH adjustment;
    heating to a temperature ranging from 75° C. to 99° C. and holding for 15 seconds to 400 seconds to obtain a beverage base product;
    cooling the obtained beverage base product to 65° C. or below;
    adding buffer to achieve pH of 6.7 to 7.0;
    sterilizing at ultra high temperature (UHT) conditions at 136-150° C. for 3-15 seconds;
    cooling to 25° C. or below to form a beverage solution, wherein the beverage solution comprises casein-whey protein aggregates having a volume based mean diameter value of at least 3μm as measured by laser diffraction; and
    filling aseptically the beverage solution in an aseptic container to form the ready-to-drink beverage.

2. The method according to claim 1, wherein the flavor component is selected from the group consisting of a cocoa component, a fruit flavor component, and combinations thereof.

3. The method according to claim 1, wherein the stabilizer system comprises microcrystalline cellulose (MCC), carboxymethyl cellulose (CMC) and carrageenan.

4. The method according to claim 3, wherein the microcrystalline cellulose (MCC) and carboxymethyl cellulose (CMC) are present in a co-processed form in a total amount of about 0.05 w/w% to about 0.18 w/w% of the beverage.

5. The method according to claim 3, wherein the carrageenan is present from about 0.01 w/w% to about 0.10 w/w % of the beverage.

6. The method according to claim 1, wherein the acidifier is selected from the group consisting of lactic acid, glucono delta-lactone (GdL), phosphoric acid, ascorbic acid, acetic acid, citric acid, malic acid and combinations thereof.

7. The method according to claim 1, wherein the sugar is sucrose up to about 4.5 w/w % of the beverage.

8. The method according to claim 1, wherein the beverage composition comprises fat in an amount not more than 2 w/w% of the beverage.

9. The method according to claim 1, further comprising mixing fat to the beverage composition, wherein the fat is no more than about 2 w/w% of the beverage.

10. The method according to claim 1, further comprising mixing a calcium salt to the beverage composition.

11. The method according to claim 10, wherein the calcium salt is selected from the group consisting of calcium carbonate, calcium phosphate, calcium lactate-citrate, calcium citrate, and combinations thereof.

12. The method according to claim 1, wherein the stabilizer system comprises microcrystalline cellulose (MCC), carboxymethyl cellulose (CMC) and carrageenan, the MCC and CMC are present in a co-processed form in a total amount of about 0.05 w/w% to about 0.18 w/w% of the beverage, and the carrageenan is present from about 0.01 w/w% to about 0.10 w/w % of the beverage.

\* \* \* \* \*